United States Patent [19]

Blackburn

[11] Patent Number: 4,646,695
[45] Date of Patent: Mar. 3, 1987

[54] DEVICE FOR IMPROVING THE IGNITION OF FUEL-AIR MIXTURES IN INTERNAL COMBUSTION ENGINES

[75] Inventor: Donald Blackburn, Roane County, Tenn.

[73] Assignee: Oak Ridge Systems, Inc., Oak Ridge, Tenn.

[21] Appl. No.: 806,678

[22] Filed: Dec. 9, 1985

[51] Int. Cl.$^4$ .................. F02B 19/16; F02B 19/18
[52] U.S. Cl. .................................. 123/256; 123/266; 123/268; 123/293
[58] Field of Search ............ 123/256, 266, 267, 268, 123/293, 263, 280

[56] References Cited

U.S. PATENT DOCUMENTS

| | | | |
|---|---|---|---|
| 1,422,794 | 7/1922 | Smith | 123/256 X |
| 2,100,320 | 11/1937 | Browning | 123/266 |
| 2,118,058 | 5/1938 | Riley | 123/266 X |

FOREIGN PATENT DOCUMENTS 368347  3/1932  United Kingdom ............ 123/256

*Primary Examiner*—Tony M. Argenbright
*Attorney, Agent, or Firm*—Pitts and Brittian

[57] ABSTRACT

A flame ignitor for internal combustion engines. This flame ignitor is, in one embodiment, an insert unit to be received in, for example, a conventional spark plug hole of an engine. It is to project into the combustion chamber of the engine a sufficient distance, and at a selected orientation, such that a bell-shaped opening will collect a portion of fuel-rich fuel-air mixture from within the combustion chamber and direct the same toward a spark gap of a spark producing device located in the opposite end of the unit. The device has an elongated secondary chamber proximate the combustion chamber and a primary chamber proximate the spark gap. The bell-shaped opening into the secondary chamber is preferably oriented to give a spiral movement to incoming fuel mixtures. In addition, an outlet from the secondary chamber is provided more closely on axis of the unit to permit ignited fuel-air mixtures to pass into the largest volume in the exhaust portion of the engine combustion chamber above the piston head at a high rate of speed to ignite any fuel-air mixture therein prior to the initiation of combustion knock. Embodiments for several types of engines including four-cycle, two-cycle, and computer-controlled are described. An embodiment for manufacture as a portion of an engine is also described. Emissions are reduced and improved operating efficiency is achieved with the flame ignitors.

25 Claims, 22 Drawing Figures

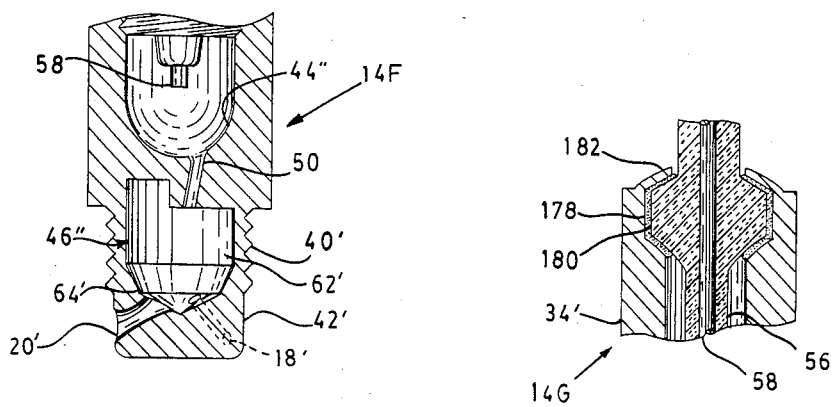
Fig. 11
Fig. 14
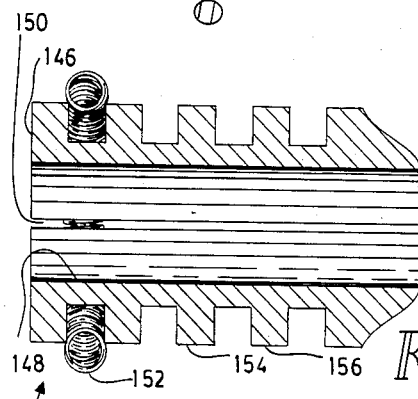
Fig. 12A
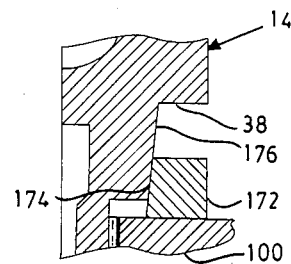
Fig. 13
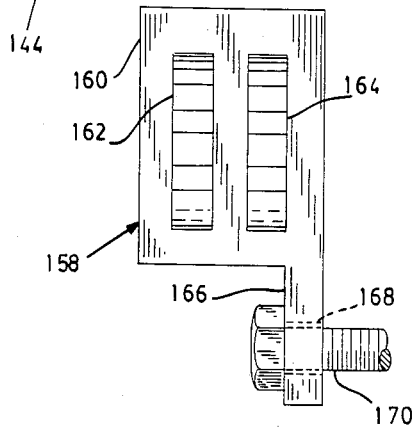
Fig. 12B

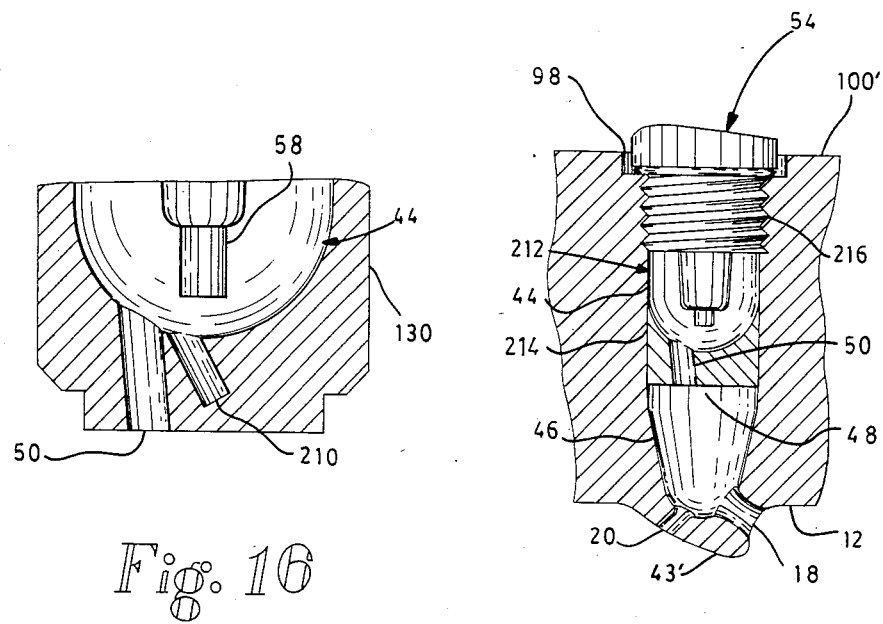
Fig. 16
Fig. 17
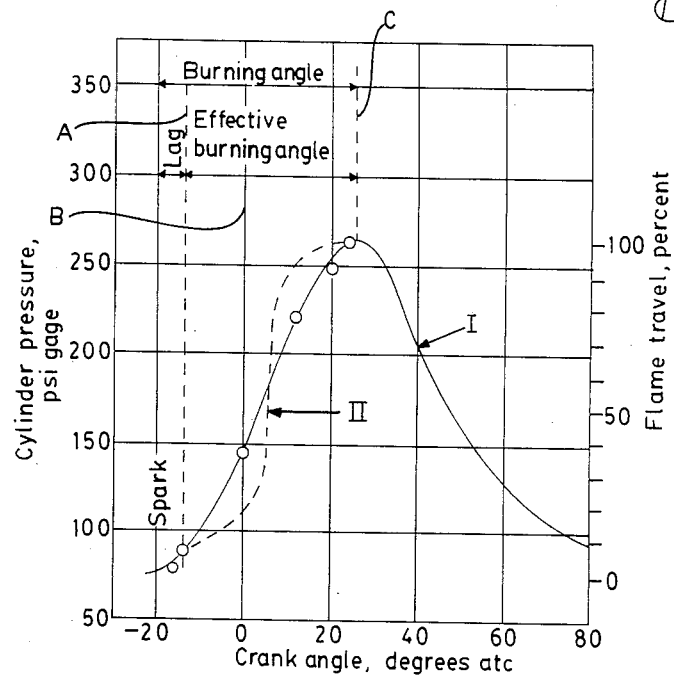
Fig. 18

DEVICE FOR IMPROVING THE IGNITION OF FUEL-AIR MIXTURES IN INTERNAL COMBUSTION ENGINES

TECHNICAL FIELD

This invention relates to ignition devices for fuel-air mixtures in internal combustion engines, and more particularly to a device to be used in combination with conventional spark plugs or with other regular or special spark producing devices whereby a portion of the enriched fuel-air mixtures within the engine cylinder is directed into the spark gap of the spark producing devices, and the resultant ignited fuel-air mixture is directed back into the engine combustion chamber at an optimum rate of speed for the load on the engine to further enhance the total ignition of the mixture and thereby permit reduction of the fuel/air ratio without loss of power or incurring combustion knock.

BACKGROUND OF THE INVENTION

Until recent years, internal combustion engines have employed almost unchanging principles of operation. This applies to both two-cycle engines and four-cycle engines. However, as the problems of pollution control and efficiency are addressed, there have been new approaches to the functioning of these engines. For example, the shape of the combustion chambers has been modified, fuel injection is being used, and various devices have been devised to "preignite" the fuel mixture in localized spots in order to enhance the ignition of the total fuel mixture. Most automobile manufacturers, in the United States at least, utilize computer control which includes an adjustment of timing rather than rely upon vacuum control. Even multiple spark plugs for each cylinder are utilized in certain engines. Some engines are now manufactured with three or four valves per cylinder, rather than two, to improve performance. Some late model and experimental engines use various designs of piston and cylinder heads to form varying-shaped combustion chambers such as hemispherical, wedge, "L" and others. Still other engines utilize port, slide, poppet or rotary valves. These are just a few of the variations that have been utilized to improve engine efficiency and reduce the pollution caused by these engines.

Because of the many variations in engine design, certain definitions are used hereinafter with regard to application of the present invention to those engines. For example, reference will be made to the "exhaust", "exhaust manifold" or "hotside" to indicate the region of highest temperature in the combustion chamber, and "intake" or "intake manifold" to indicate the lowest temperature region.

Many of the improvements devised for internal combustion engines have originated in Japan, particularly for use in Honda and Toyota vehicles. Typical of such devices are shown in U.S. Pat. Nos. 4,038,959; 4,076,000; 4,092,969; 4,144,848; and 4,174,679. Other devices for this purpose are shown in U.S. Pat. No. 4,416,228 (for a German development), and a paper on "Swirl-Chamber Spark Plugs Improve Combustion Process", written about developments by Bosch engineers in Germany. Another special unit for increasing the efficiency of combustion is shown and described in U.S. Pat. No. 4,534,327, assigned to Bosch.

Also a device for these purposes is described in my U.S. Pat. No. 4,218,993. In the last of these references, I describe the use of the injection of a small quantity of highly combustible fuel into the region near the spark gap to enhance the ignition of the regular fuel mixture and to produce a high-speed flame to further ignite all of the fuel mixture.

Many of the devices require a substantial change in the structural portions of an engine and therefore are not of value in the conversion (i.e., retrofit) of a "conventional" engine. Of course, the structural changes required to accommodate these designs in a retrofit process will be determined by the specific engine design. The ignition devices of the prior art that can be used to retrofit an engine without structural change do not include elements for controlling the timing for satisfactory performance at speeds from idle to full throttle. They do little, if anything to eliminate combustion knock or enhance overall combustion control.

Although many of the devices that have been recently developed and put into service have improved efficiency, performance and reduced pollution, there is need for a further improvement for vehicles of the future. In 1983, a report (DOE/NASA/0131-1) prepared as a result of a joint study by the Department of Energy, the National Aeronautics and Space Administration, and the National Science Foundation stated "The concept that a lean combustion engine offers distinct advantages, both with respect to pollution as well as efficiency, is well known as attested by the development of stratified charge engines. However, efforts to achieve satisfactory performance under extra-lean conditions have been so far unsuccessful." Sandia National Laboratories, in a newsletter (Vol. 20, No. 4, Apr. 1985), reported on their research related to understanding "engine knock" in order to determine possible ways to prevent the same so that higher compression ratios can be used to increase fuel mileage and torque.

Accordingly, it is a principal object to provide a device for use in internal combustion engines, which will improve efficiency and performance, and will further reduce the generation of polluting emissions.

Another object of this invention is to provide means whereby extra lean fuel mixtures and/or low octane fuel can be used in an engine without producing combustion knock.

It is a further object of the present invention to provide a device to accomplish these advantages and which can be easily added to engines presently in service.

It is also an object of the present invention to provide a device that can be adapted to new production-type engines without major retooling.

It is another object to provide a device for this usage that accomplishes good performance at all power levels with little or no use of a conventional spark advance.

Another object of the present invention to provide a device with controlled flame delay which will allow it to be used in conventional engines with no timing adjustment or other alterations.

Still another object of this invention is to provide a device that will allow automobile and other manufacturers to reduce engine size while maintaining the same or greater power output, or to achieve higher output with the same size engine.

These and other objects of the present invention will become apparent upon a consideration of the drawings illustrated below and a complete description of the invention.

SUMMARY OF THE INVENTION

In accordance with the present invention, there is provided an insert unit to be received in a conventional spark plug hole (or into a special hole) of an engine and to project into the combustion chamber of the engine a sufficient distance, and at a selected orientation, such that a bell-shaped opening will collect a fuel-rich portion of the fuel-air mixture from within the combustion chamber swirl and direct the same toward a spark gap of a spark producing device located in the opposite end of the device. The device has a secondary chamber proximate the combustion chamber connected by an aperture to a primary chamber proximate the spark gap. An outlet from the secondary chamber is provided to direct ignited fuel-air mixtures to pass into the engine combustion chamber at a high rate of speed to ignite any fuel-air mixture therein. This outlet is oriented to direct the flame into the region of greatest volume in the combustion chamber on the exhaust side above the piston head, thereby causing rapid ignition and thereby eliminate detonation or combustion knock. The device is self-regulating for all loads on the engine.

BRIEF DESCRIPTION OF THE DRAWINGS

FIG. 11 is an enlarged drawing of an embodiment of the present invention for use in a two cycle engine, such as an outboard marine engine.

FIGS. 12A and 12B are a drawing illustrating an adapter for providing cooling to units of the present invention, with FIG. 12A illustrating a finned sleeve and FIG. 12B illustrating a heat sink to mesh with the sleeve to transfer heat to a cooled surface.

FIG. 13 illustrates one embodiment of a sealing ring to be used with the present invention to achieve proper sealing at a selected rotation of the present invention so as to obtain proper orientation within an engine combustion chamber.

FIG. 14 is a drawing illustrating one embodiment wherein a separate spark plug is eliminated for the utilization of the present invention.

FIGS. 15A, 15B and 16 are cross-sectional drawings of embodiments of the present invention for use in an automobile engine wherein computer-controlled spark advance is normally utilized, or for installation without any timing adjustments.

FIG. 17 is a drawing illustrating the incorporation of the present invention into the combustion chamber head for original equipment rather than retrofit.

FIG. 18 is a graph illustrating the relationship of combustion chamber (cylinder) pressure as a function of crank angle for a conventional spark plug equipped engine, and a projected relationship for the present invention.

DETAILED DESCRIPTION OF THE INVENTION

Figure 1:
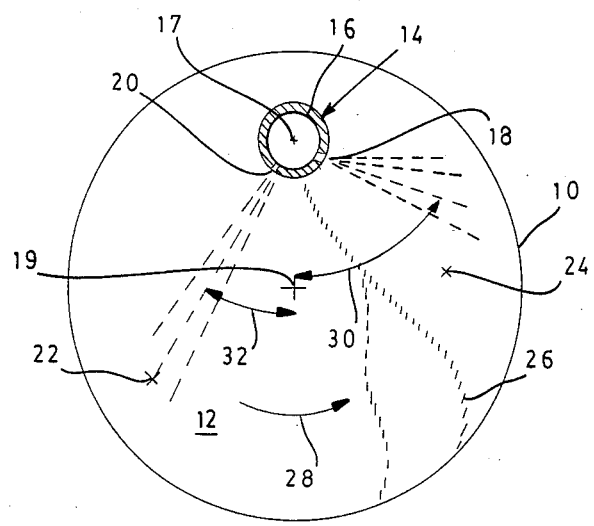
FIG. 1 is a drawing depicting the interior of a typical combustion chamber of an internal combustion engine looking along the combustion chamber toward the top thereof which normally contains the ignition (spark) plug.

For a better understanding of the operation of the present invention, it is deemed appropriate to briefly describe some of the events that occur in an internal combustion engine that lead to reduced efficiency and other poor performance. This discussion is related to FIG. 1. This is a view along the length of a typical combustion chamber 10 (with an axis 19) looking toward the top 12 thereof. At some point in this top is a ignition device 14 (illustrated here as one embodiment of the present invention). This device is shown to have a central bore 16 with a centerline 17, an inlet port 18 and an outlet port 20. The function of these components will be discussed hereinafter.

It is well recognized that there is a region within the combustion chamber, such as at 22, that has a higher temperature than the average, and a region 24 that has a lower temperature than the average. The exact position of these regions differs from engine to engine, and even possibly from chamber to chamber within an engine. The region of highest temperature is generally located on the exhaust side. This is the region most prone to producing combustion knock. The flame should be directed to the hot spot through as much of the combustion chamber volume as possible. This promotes more complete combustion, resulting in lower emissions. The temperature differences are due, at least in part, to differences between burned and unburned gases, their amount of mixing, the location of the valves, etc.

Although four-cycle engines have a separate exhaust stroke, it is recognized that not all of the burned gases are removed from the combustion chambers prior to the introduction of new fuel during the intake stroke. This remaining burned gas, or clearance gas, and exhaust gases which enter because of low absolute pressure in the combustion chamber and the intake manifold, (referred to hereinafter as bad gas) impede the proper ignition of the fresh fuel-air mixture (referred to hereinafter as good gas). The design of the combustion chamber is such that at idle and low load conditions a conventional swirl as indicated by arrow 28, exists which, utilizing momentum of the gases and centrifugal force, separate unburned gases (heavy and cold) from the burned gases (hot and light) due to differences in their temperature and density. Engine designers attempt to optimize the effect of these differences through the design of the combustion chamber by varying the shape of both the combustion chamber head and top of the piston. This causes the gases to rotate about in the combustion chamber as indicated by the arrow 28 with the heavier or good gases being closer to the combustion chamber wall. This is a favorable condition for engines with conventional spark plugs as well as for engines utilizing the present invention. Any bad gas remaining in the combustion chamber is forced to the center by the conventional swirl and contributes to higher pressures at top-dead-center. In conventional engines, combustion chamber valve locations and spark plug location are selected to optimize performance.

As a part of the present invention, in order to utilize the good gases, the inlet port 18 to the device 14 is bell mouthed and is aligned at a selected angle 30 to the plane through the axis 17 and axis 19 such as to be directed toward the region 24 of this concentration of good gas. Furthermore, this inlet port 18 is oriented so as not to be directed to intersect the axis 17. Because of this orientation, the good gases swirl around within bore 16. The outlet port 20, which is a high velocity nozzle, is directed at an angle 32 toward the region of largest volume on the hot side (as indicated at 22) to achieve the most effective use of the flame exiting the device 14. Although this flame from exit nozzle 20 is the principle flame, some flame will exit port 18. The lines at 26 in FIG. 1 represent a typical interface between these flames. The outlet port 20 is directed to intersect the axis 17. A discussion is given hereinafter as to the manner of locating these positions for the proper orientation of the devices of the present invention.

Figure 2:
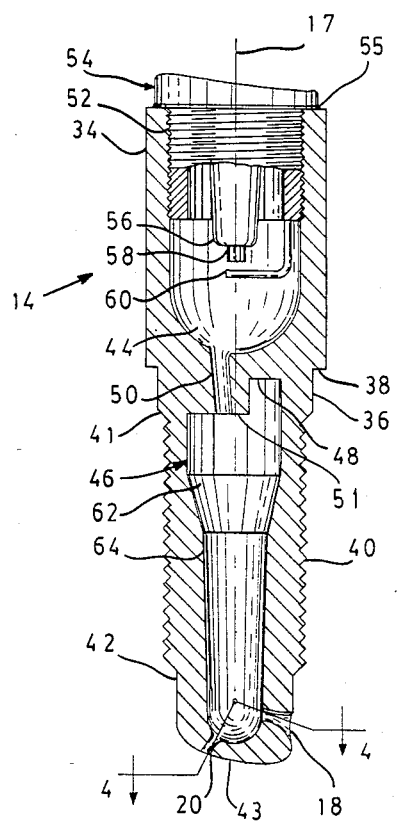
FIG. 2 is a cross-sectional view of one embodiment of the present invention as enlarged to better understand the components thereof.

An enlarged drawing, in cross-section, of one embodiment of a flame ignition unit 14 of the present invention is shown in FIG. 2. The terms "top" and "upper" as well as "bottom" and "lower" are used for convenience even though the unit can be used in an engine placed in other orientations, such as a radial engine. The unit 14 has a body formed with an upper portion 34 and a lower portion 36 separated from the upper portion by a shoulder 38. The exterior of the lower portion 36, over a substantial portion, is provided with threads 40 that match the internal threads of a spark plug opening or other opening provided in an engine. There is a tapered transition 41 to the threads 40. The rounded end 42 of the device is such as to extend approximately to the same position in an engine cylinder as the end of a conventional spark plug, and the length of the body below the shoulder 38 is selected to accomplish that positioning. As shown, the extreme end is contoured, as indicated at 43, to reduce the pressure within the device at the outlet 20.

The flame ignition unit 14 is provided with two internal and generally aligned chambers 44 and 46 that are separated by a barrier 48. This barrier has an aperture 50 such that communication is provided between the "primary" or flame generating chamber 44 and the "secondary" chamber 46. The small size of the primary chamber 44 promotes a rapid warmup period; thus, reducing the amount of choking and fuel consumption. As shown, the entry into this aperture 50 from the primary chamber 44 has rounded edges in this embodiment (and other embodiments) to readily permit the flow of flame out of the primary chamber. Because of the high temperature in the aperture 50, additional material can be provided as at 51 to uniformly surround the aperture and provide for removal of that heat to the body 36. As shown in other of the figures, this additional material is optional.

In this embodiment, the primary chamber is provided with internal threads 52 in an upper portion to threadably accept a conventional spark plug 54 (or a special spark-producing device) of the type having a central insulator 56 and electrode 58, as well as a ground electrode 60. In this specific embodiment, the principal spark ignition occurs only between the electrodes of the plug. This is in contrast with embodiments shown in other of the figures. As discussed hereinafter, the location of the aperture 50 with respect to the orientation of the plug electrodes will depend upon the specific performance characteristic of the engine into which the present invention is to be installed.

In this embodiment of FIG. 2, the secondary chamber 46 is shown as having two portions of different cross-sections. An upper portion 62, that has communication with the aperture 50, is of greater diameter than a lower portion 64. This difference in diameter (together with the space adjacent the material 51) will be discussed as part of the operation of the present invention. The relative lengths of the portions 62, 64 of the secondary chamber 46 also relate to the operating performance of the device. It can be seen that the inlet port 18 and the outlet port 20 communicate with the lower portion 64 of the secondary chamber 46. As stated above, the ports 18 and 20 have a selected angular relationship with the axis 17 of the unit 14 and the axis 19 of the combustion chamber 10.

Figure 3A:
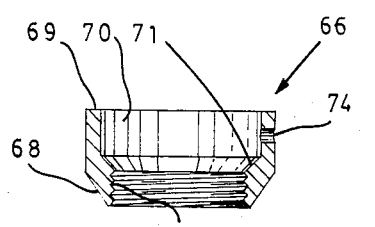
FIGS. 3A and 3B show a cross-sectional view of two adapter rings useful for the embodiment of FIG. 2 when used in an engine head having either tapered seats or flat seats for the normal ignition plug.

Since the inlet and outlet ports must have a selected orientation within a combustion chamber, an adapter will be needed with flat bottomed or tapered spark plug seats. If this flame ignition unit is to be used in an engine having a tapered spark plug seat, the adapter 66 of FIG. 3A can be used to accommodate such usage. The exterior of this adapter is provided with a tapered portion 68 to match the taper of the spark plug opening. The top rim 69 is flat so as to be parallel with the flat shoulder 38 of the ignition unit 14. The interior of the adapter is provided with an unthreaded upper portion 70 to closely receive (an interference fit) the unthreaded portion of the lower body portion 36 of the unit 14. The interior 70 terminates in a sloped shoulder 71 to generally conform to the slope 41 of the unit shown in FIG. 2 although these surfaces seldom will touch. The lower internal portion has threads 72 to engage the threaded portion 40 of unit 14. When such are engaged, since the seal is provided by contact between surfaces 36 and 70, the unit 14 can be rotated up to one full turn with respect to the adaptor 66 to achieve the desired port orientation. As discussed below a mark on the body 34, when properly directed, indicates proper alignment. The unthreaded portion 70 can be provided with a radial opening 74 whereby a spanner wrench or similar device can be used to securely held the adapter 66 while the unit 14 is rotated.

Figure 3B:
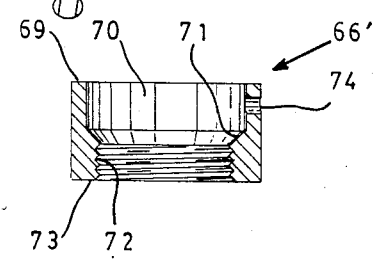

Another adaptor 66' is shown in FIG. 3B. This adapter is for use with the device 14 of FIG. 2 when the engine has a flat shoulder for the seating of conventional spark plugs. It is substantially identical with the adapter 66 of FIG. 3A except for a flat lower rim 73.

Figure 4:
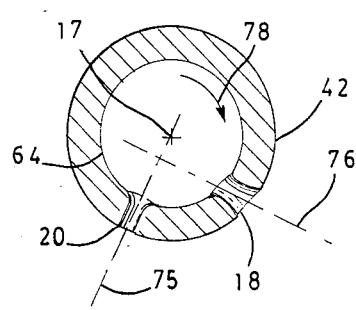
FIG. 4 is a cross-sectional view of the active tip of the embodiment of FIG. 2 taken along the line 4—4 thereof.

A cross-sectional view of the tip 42 of the flame ignition device 14 is shown in FIG. 4. This is taken at the line 4—4 of FIG. 2. It is depicted in this view that the axis 75 of the outlet port 20 substantially intersects the axis 17 of the secondary chamber portion 64. This provides for the escape of a flame produced in the device with minimal deterrent. The inlet port 18, however, is illustrated as having an axial orientation 76 not aligned with the axis 17. Accordingly, incoming gases are caused to swirl within the chamber portion 64 in a direction indicated by the arrow 78. This imposes a centrifugal action upon the incoming gases and can be used to effect improved combustion if the aforementioned aperture 50 to the primary chamber is positioned to preferrentially accept the heavier (richer) gases. (The embodiment illustrated in FIG. 9 further enhances this effect.)

Based upon the results obtained using improved flame ignition units such as that illustrated in FIG. 2 (see Examples hereinafter), a tentative theory of operation has been developed. This is thought to explain the smooth running of an engine at both idling conditions and at full power conditions. This smooth running at all power levels is obtained without, or with substantially reduced, use of a conventional (vacuum) spark advance. (When desired, flame delay can be designed in the primary generating chamber as shown in FIGS. 10, 15 and 16 so that no timing adjustment will be required.) Under both conditions (idle and full power), a fuel-rich mixture is forced into the unit 14 during the compression stroke principally through the larger bell-shaped inlet port 18 which is oriented toward the area of good gas in the combustion chamber. If the inlet port axis is oriented as in FIG. 4, the good gases accummulate and flow upward along the outer wall of the secondary chamber 46 and thence through aperture 50 into the primary chamber 44.

At idle, a pressure of about 3 to 4 atmospheres is created within the primary and secondary chambers. When the fuel in the primary chamber is ignited by the spark plug (or other spark device), the resultant flame passes at a relatively slow speed from the primary chamber 44 through the aperture 50 into the secondary chamber 46. This flame then ignites fuel in the secondary chamber producing a flame that exits primarily through the exit port 20 (and and some through the inlet port 18) into the engine combustion chamber. Due to the relatively slow speed of flame propogation at these pressures, substantially all fuel within the secondary chamber is ignited, even in the outer periphery of portion 62. The slower propogating flame from the unit 14 is sufficient to provide effective burning of fuel in the cylinder under these idling conditions.

A different internal operation appears to take place at open throttle (power) conditions. Such operation increases the pressure in the two chambers to about 7–9 atmospheres. The momentum of incoming charge into chamber 44 sets up turbulence that enhances the flame dynamics. When ignition occurs in the primary chamber 44, the flame exiting through the aperture 50 into the secondary chamber 46 has sufficient velocity that it initially only ignites gases directly along its route to the exit port 20 leaving some unburned gases in the outer periphery of portion 62. The temperature of these bypassed gases is raised significantly by the heat of the flame and thus a very rapid expansion is produced (the pressure can increase by a factor of three) as these bypassed gases ignite. This pressure increase provides further velocity to a flame exiting into the engine combustion chamber and thereby increases ignition propogation within the combustion chamber. The resultant velocity is sufficient to transmit the exiting flame to the region where combustion knock normally occurs before such knock can occur. (In some engines this flame must be reflected off some portion of the combustion chamber in order to reach the desired region.)

Since the bell-shaped inlet port 18 is located entirely above the end of chamber 62 and is not aligned with the axis of chamber 62 (in contrast to the position and orientation of outlet port 20), any flame exiting port 18 is much slower than that through port 20 and is generally plume-shaped due to the design. This flame then causes ignition of good gas in the region of influence (these gases would not produce combustion knock). The flame jet from port 20 appears to produce a non-turbulent flame front without causing unburned gases to mix with burned gases; this is believed to account for the very low hydrocarbon content in the exhaust emissions. Operation at mid-power is believed to be a combination of the performance at idle and at full power. Apparently this self control of the ignition eliminates the need for any significant vacuum spark advance, if any.

The theory of operation of the present invention can be further illustrated by referring to FIG. 18. Shown therein, by Curve I, is a plot of the combustion chamber (cylinder) pressure as a function of crank angle and flame travel when using conventional spark plugs. These data were obtained for a test-stand engine, but are typical to an engine in an automobile. With a spark produced at or about 20 degrees before top-dead-center (BTDC), the pressure rises gradually with line A being the angular position of spark generation and line B being TDC. Ultimately, the maximum pressure occurs at Line C indicating some angular position past TDC. However, any pressure rise created prior to TDC opposes compression and is actually lost work which must be compensated for during the remainder of the flame travel and pressure rise.

With the present invention, however, the flame travel speed is considerably increased. As a result, the spark can be delayed, and the rapid flame travel and pressure rise can be described by Curve II. It can be seen that substantial reduction in pressure rise occurs before TDC and, therefore, more efficiency is achieved. The flame speed within the device can be retarded (as discussed hereinafter) for adjusting an engine for optimum performance.

Figure 5:
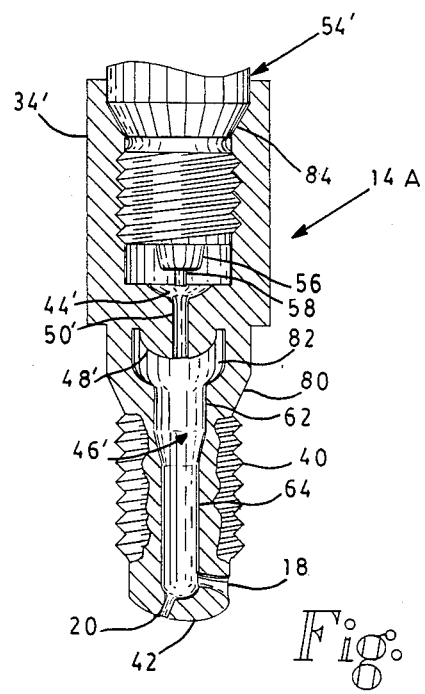
FIGS. 5 through 7 are cross-sectional views of other embodiments of the present invention as constructed for specific applications described herein.
Figure 6:
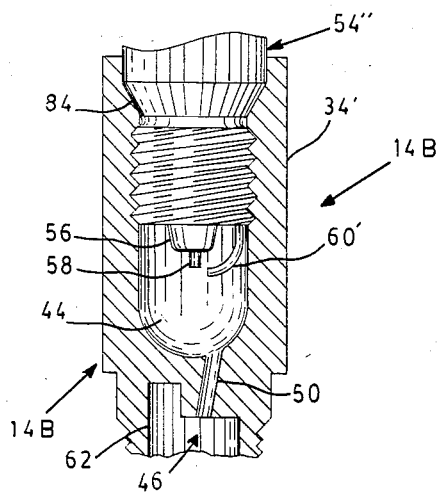
Figure 7:
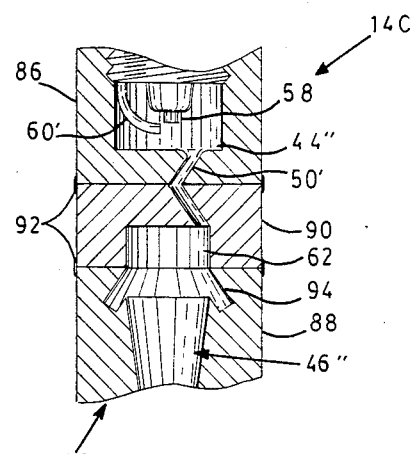

Certain types of engines have normal operating characteristics that must be taken into account in employing a flame ignition device of the present invention. Shown in FIGS. 5 through 7 are certain of these various units. The unit 14A of FIG. 5, for example, is designed to receive a spark plug 54' that has no ground electrode; only a central insulator 56 and hot electrode 58. In this case, the upper surface of barrier 48' serves as the ground electrode. While the aperture 50 is shown as being substantially on the axis, other positions can be utilized as discussed in connection with FIGS. 6 and 7.

Another design variation illustrated in FIG. 5 (which is a high performance unit as required for racing, for vertical takeoff aircraft, etc.) is a modification to the secondary chamber 46'. In addition to the portions 62, 64 as in the unit of FIG. 2, a further radial expansion region 82 is provided. This region 82 traps additional gas which, during power operation, expands and ignites behind the flame front to provide higher velocity to the flame entering the engine combustion chamber. Also, this embodiment 14A is provided with a tapered surface 84 at the top of the body 34' to receive a tapered seat of the spark plug 54' (an optional construction) in contrast to the construction in FIG. 2. In engines where power is the main concern and omissions are secondary, more than one outlet 20 port can be used to direct the flame jet throuoghout the combustion chamber.

FIG. 6 depicts, in cross-section, another embodiment 14B of the present invention. The upper portion of the body 34' is substantially like that of FIG. 5 in that it (optionally) accepts a spark plug 54" shown therein has a central insulator 56 and electrode 58, together with a shortened ground electrode 60'. The aperture 50 is shown as being generally directed toward the region of the primary chamber 44 wherein the spark between electrodes 58, 60' first initiates combustion. This alignment prevents any delay in propogation of the flame from chamber 44 into the secondary chamber 46. This can be contrasted with the non-alignment illustrated in FIG. 7.

Referring now to FIG. 7, shown therein is another embodiment of the present invention. This embodiment 14C is shown as accepting a spark plug of the type illustrated in FIG. 6; one having a center electrode 58 and a shortened ground electrode 60'. In this embodiment, the body (corresponding to portions 34, 36 of FIG. 2) of the unit comprises an upper portion 86, a lower portion 88, and an intermediate portion 90. These portions are joined as with a peripheral weld or braze 92. This construction is utilized so as to provide for forming a modified aperture 50' communicating between the primary chamber 44" and the secondary chamber 46". During compression, the heavier gases from the outer wall of portion 62 are transferred into the primary chamber 44". The same aperture then transfers a flame after ignition in the reverse direction. Because of the distance between the spark region and the aperture 50', some delay is created. Further delay or slowing of the flame is introduced because of the tortuous path of the aperture 50'. This delay may be required for ignition timing purposes in the proper performance of certain engines, including certain engines having computer controlled ignition. (See also FIGS. 10 and 15.)

The embodiment of FIG. 7 shows a radial groove 94 in the wall of portion 62 of the secondary chamber 46". This radial groove serves a similar function as the portion 82 of FIG. 5; it provides a source of unburned gases during high power operation which then burn behind the flame front for rapid expansion and increased velocity of a flame front into and across an engine combustion chamber.

Figure 8:
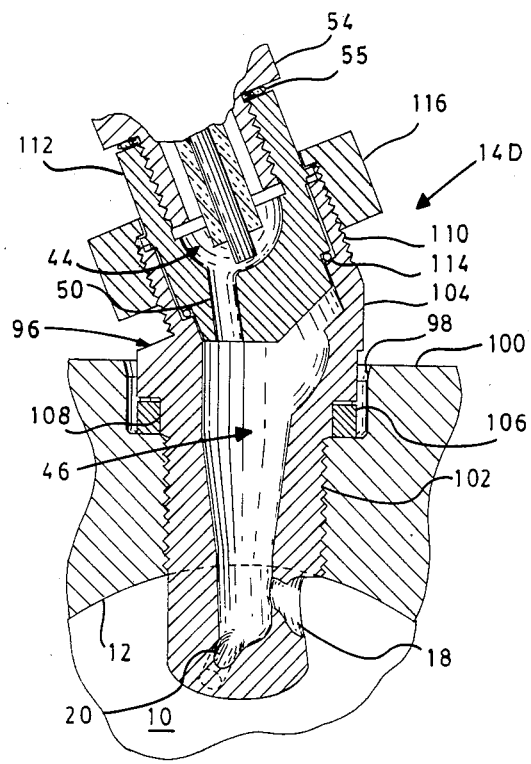
FIG. 8 is a cross-sectional drawing of an embodiment of the present invention wherein the unit can be installed more readily when there are obstructions preventing in-line installation.

All of the above-described embodiments of the present invention are illustrated as being threadably received in spark plug openings of an engine. There can be applications, however, where conditions are such that threadable engagement (and particularly proper alignment with a hole) is impractical. For example, the spark plug opening may be partially obscured by other engine components. One solution for this type of installation is the use of an offset insert threaded into the spark plug opening, the insert adapted to frictionally receive a flame ignition unit of the present invention. This construction is illustrated in FIG. 8 at 14D. The specific insert 96 is shown as positioned within a spark plug recess 98 in an engine head 100. The insert is provided with a secondary chamber 46, and wtih an inlet port 18 and an exit port (nozzle) 20. The exterior of the lower portion of the insert is threaded as at 102 to be threadably received in the head 100. The top of the insert 96 can be provided with external surfaces, as at 104, whereby an appropriate wrench can be used to tighten (or remove) the insert relative to the head 100. A principal seal is provided by a ring 106 (see FIG. 13 and a description of a comparable ring 172). This ring has an internal interference fit with the exterior of the adapter at 108 and is of a size such that the adapter can be rotated after the seal ring 106 seals against the bottom spark plug recess 98 for proper alignment of the ports 18, 20 within a combustion chamber 10. This is a similar type of arrangement as discussed with respect to FIGS. 3A and 3B.

The upper portion of the adapter 96 is also threaded at 110 and is inclined at an angle such as to permit access that does not interfer with other components of an engine. Slidably received in this upper portion of the insert 96 is a body 112 which is provided with a primary chamber 44 and with an aperture 50 for connecting the primary chamber 44 with the secondary chamber 46. The upper portion of body 112 is internally threaded to accept a conventional (or special) spark plug 54 with its conventional gasket 55. The body 112 seats against an annular gasket 114, and is tightened thereagainst with a clamping nut 116. With this construction, the insert 96 can be properly oriented, and then the body 112 axially inserted and clamped in place.

Figure 9:
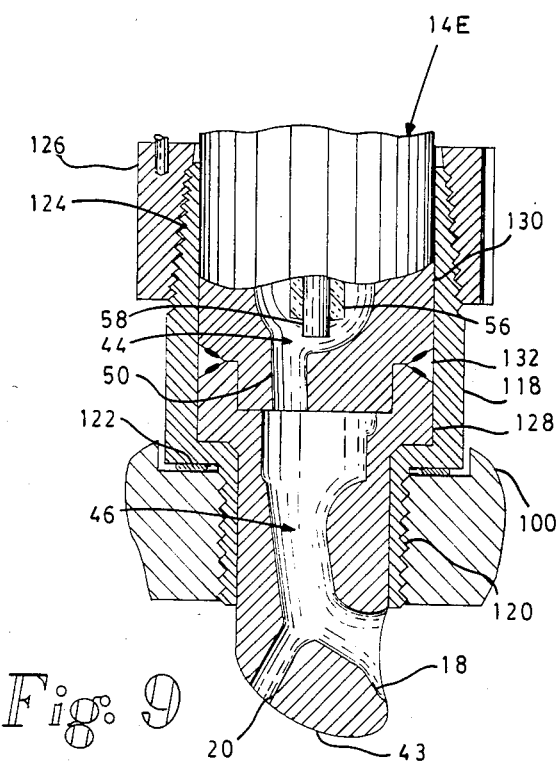
FIG. 9 is a cross-sectional drawing of an embodiment of the present invention wherein centrifugal action assists in directing fuel-rich vapors into the primary chamber, and wherein a permanent insert is used to accept the present ignition device.

Another type of insertable unit 14E is illustrated in FIG. 9. In this embodiment a sleeve 118 is threadably received in the engine head 100 as at 120, with a conventional spark plug gasket 122 providing the seal therebetween. The upper end of the sleeve is provided with a tapered and threaded portion 124, and an internally tapered and threaded collar 126 is engaged therewith. Slidably received within the sleeve 118 is the flame ignition unit 14E of the present invention having a primary chamber 44, a secondary chamber 46, passageway 50, and inlet and outlet ports 46, passageway 50, and inlet and outlet ports 18, 20, respectively. This unit is fabricated of two portions 128, 130 which are joined as with a weld at 132. A separate spark plug can be used as in the other embodiments, or the insulator 56 and center electrode 58 can be incorporated as indicated in FIG. 14. A seal between the unit 14E and the sleeve 118 is effected by the clamping action of the collar 126; the collar being tightened after the unit 14E is positioned with proper orientation of ports 18, 20.

As stated above, optimum operation of a flame ignition unit, such as shown in the figures, depends primarily upon the orientations of the bell-mouth inlet port 18 and the exit port 20. For any type of engine, and even the different combustion chambers of that engine, there is an optimum orientation. In addition, many engines have adjacent combustion chambers that are mirror images to facilitate inlet and exhaust manifolds, etc. At least three types of orientation studies are required: (1) the orientation of the centerline of the spark plug hole to the top of the piston; (2) an orientation relative to some standard position because of the variation in the threads between the different spark plug holes; and (3) the orientation between the inlet port 18 and the outlet port 20 and orientation of each within combustion chamber.

The first two of these orientations can be determined by appropriate gauges threaded into the spark plug holes, for example. The angular orientation for a specific type of engine will be the same for every engine of that type; however, each threaded opening may differ. A tool for this determination will measure the angular position relative to some established point whereby a flame injection unit can be inserted with the ports having proper orientation. A numbering system, for example, on units can be used to obtain the desired orientation when the unit is torqued into place (using for example, the collars of FIG. 3 or the ring of FIG. 13.)

The third type of orientation determination, which can proceed or follow the rotational orientation, is needed only for an initial determination for a specific type of engine. This orientation involves the optimum angular relationship between the inlet port and the outlet port to achieve the greatest benefit from flame ignition units for that engine. The proper orientation is initially accomplished by installing test units having different port angular relationships until the optimum is ascertained. Thereafter, units having that angular relationship can be installed in any engine of that type following the rotational orientation determination as indicated above. Again, a numbering system can be used to select the proper units for a given type of engine. These orientations are then appropriate for all engines of that particular type (Chrysler, Ford, GM, etc.).

As stated above, the present invention is also suitable for use in a two cycle (two stroke) engine. Some physical modification is required, however, for such utilization. Shown in FIG. 1 is a typical construction of a unit for a two cycle engine. The length dimensions of the components of the flame ignition units 14F are shortened considerably because there is only a very small clearance between the top of the piston and the top of the combustion chamber. For exact spacing, and for proper alignment of the ports, seal rings such as shown in FIG. 3 or FIG. 13 can be used.

Another distinction of this type of engine relates to the manner of introduction of the fuel-air mixture into the combustion chamber and to the shape of the piston top to accommodate the intake and exhaust. The piston top has a "relieved" portion on the intake side which extends nearly 180 degrees around the piston crown, which relieved portion represents a volume of at least fifty percent of the total volume above the piston at top-dead-center of the piston stroke. Since the composition of the mixture throughout this intake portion is substantially uniform, more than one inlet port 18 can be used. On the exhaust side of the piston top there is a trough with a gradual slope toward the engine exhaust ports. The combustion chamber interior has a similar slope which forms a wedge-shaped combustion region converging toward the exhaust valves. One or more outlet nozzles 20 fill this volume with flame for good ignition.

As in the other embodiments, the secondary chamber has a portion 62' of larger diameter and a portion 64' of smaller diameter in order to provide optimum operation at both idle and at full power. Each of these sections 62' and 64' are shortened in length as compared with the unit of FIG. 2 for example. In order to form each of the ports (18', 20') so as to have a proper orientation without adversely obstructing flame passage, the ports in this shortened structure can be produced with two segments (not shown), for example, to effectively turn the incoming gases and the exiting flame coming from aperture 50 in the desired directions. Different types of performance needs can be met by varying the ratio of nozzle cross-sectional area to volume of ignition chambers. For example, for continued slow speed such as trolling with an outboard motor, the nozzle cross-sectional area would be increased for a given ignition chamber volume. For higher power requirement, a smaller nozzle area would generate a higher velocity flame jet resulting in better combustion and quicker pressure rise. The quicker pressure rise of the high velocity flame generates more heat in the combustion control unit. Accordingly, a very cold spark device is used with a smaller volume in the generating or primary chamber and a shorter and heavier bodied combustion control unit is used which allows a larger heat transfer area to the cylinder head.

In many applications of the present flame ignition units provision for additional heat removal must be supplied. This includes the high performance units as well as the marine engines. An embodiment of a heat removal device is shown at 144 in FIG. 12A. This device includes a cylindrical body 146 having a central bore 148 to closely receive the body of a flame ignition unit (not shown). This body is provided with a longitudinal slot 150, and a spring 152 (for example) or other clamping means surrounds the body to maintain good heat transfer contact between the surfaces of the bore and the flame ignition unit. The exterior surface of the body 146 is provided with a plurality of annular fins, as at 154, 156, which fins radiate heat to the surrounding air or transfer heat to a heat sink 158.

The heat sink 158 for this unit is illustrated in FIG. 12B. It consists of a body 160 having a plurality of grooves, as at 162, 164, to closely receive fins 154, 156 of the radiator body 146. This heat sink body 160 is typically provided with an extension or leg 166 having an opening 168 therethrough whereby the heat sink can be attached to a cooled surface (not shown) as with a bolt 170. In this way heat can be conveyed to that cooled surface.

As discussed above with regard to FIG. 3, some installation of the present flame ignition units will require a rotational orientation other than that provided by a full seating in the spark plug hole. In order to achieve a full sealing and yet some rotational adjustment, another useful device is illustrated in FIG. 13. This involves an annular ring 172 having a slightly tapered inner surface 174. The flame ignition unit 14 adjacent the shoulder 38 is provided with a complimentary taper 176. Thus, as the flame ignition unit 14 is turned into the engine head 100, the taper 176 expands the ring 172 to provide an interference fit and thus a sufficient seal against both the head 100 and the unit 14 so that rotation of the unit can be stopped at the proper rotational orientation for the inlet and outlet ports.

Throughout the description of the embodiments of the present flame ignition units it has been implied that a separate spark plug is required. However, the invention is not limited to use of a separate plug. For example, shown in FIG. 14 is a manner of incorporating the essential components of a plug as an integral portion of a flame ignition unit. In this embodiment, the conventional insulator (or equivalent) 56 and center electrode 58 are made a part of the flame ignition unit 14G. More specifically, the body 34' is provided with an internal groove 178 to receive an enlarged shoulder 180 of the insulator 56. In addition, an upstanding rim 182 of the body is formed over the top of the insulator shoulder 180. If necessary, a high temperature cement can be placed between the body 34' and the shoulder 180 to effect an adequate pressure seal.

Some engine applications, such as late model computer controlled engines, require a slower flame propagation from the flame ignition unit than attained in the units of FIGS. 2 and 5 through 9. Some of the factors affecting propagation velocities are: ignition chamber volume and geometry, geometry of the entire unit, turbulence, nozzle areas, chamber volume to nozzle area ratio, and heat dissipation.

Figure 10A:
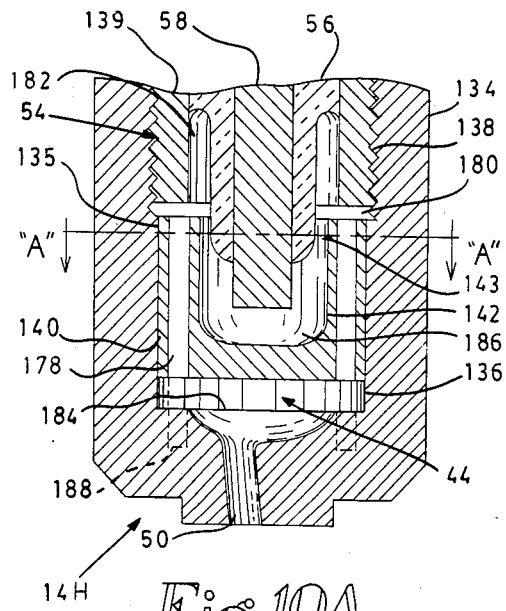
FIGS. 10A and 10B show a cross-sectional drawing of a flame ignition unit of the present invention illustrating an embodiment which supplies sufficient delay such that the unit can be utilized for engines having computer control.
Figure 10B:
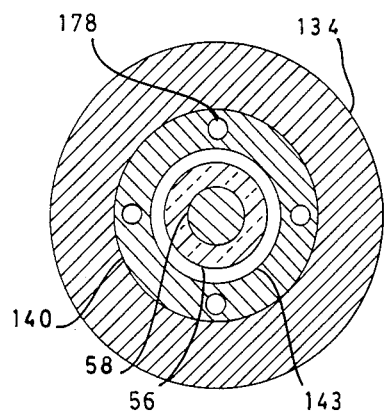

Following is a description of some design details, as illustrated on FIG. 10, utilized to control the speed of flame propagation so that the flame ignition combustion control unit can be tailored to specific applications. Shown in this FIG. 10 is only the portion of the present flame ignition unit 144 containing the primary ignition chamber 44; it would be fastened to a lower portion containing the secondary chamber in a manner similar to that of FIG. 9, for example. FIG. 10A is a longitudinal cross-section, and FIG. 10B is a transverse cross-section taken at A—A of FIG. 10A. Specifically, this embodiment utilizes a body 134 having a central hole 135, the bottom of which forms a portion 136 (primary flame generating chamber) of the primary chamber 44 with the aperture 50 leading therefrom to the secondary chamber. The upper portion of the hole in the body 135 is threaded as at 138 to receive a spark plug 54 having a central electrode 58 surrounded by an insulator 56. The shell 139 of the spark plug is shortened so that the insulator (and electrode) extend beyond the shell. Positioned (press fit) within the hole 135 between the threaded portion 138 and volume 136 is a cylindrical metal insert 140 provided with a central cup 142 which serves as the ground electrode of the plug 54. The insulator 58 extending into this cup 142 creates a gas passageway 143.

Equally spaced around this cup are a plurality of passageways 178 extending through the insert 140. These passageways communicate between an annular volume 180 created between the bottom of the spark plug (and volume 182 surrounding the insulator 56) and the volume 136. The gas passageway 143 and the volumes 180, 182 constitute an ignition chamber for this embodiment. An annular flame deflection shoulder 184 intercepts any flame coming through passageways 178 before entrance of the flame through aperture 50 into a secondary chamber.

In this embodiment, incoming gases fill volume 136, passageways 178, volume 180, volume 182, and the interior volume 186 of the cup 142. Upon the firing of a spark between electrode 58 and the cup, the fuel is ignited. At idle or low power operation of the engine, the flame proceeds out through volumes 180, passageways 178, and aperture 50 into the secondary chamber.

At high power, however, this construction introduces obstructions creating a delay in the passage of the flame. For example, the flame is directed by passageway 143 into the volume 182 by-passing the volume 180. Subsequently, the flame moves into volume 180 and thence through passageways 178 into volume 136. The fast flame then strikes the deflector shoulder 184 to create additional turbulence—and thus delay—before exiting through the aperture 50. Additional delay can be introduced, if necessary, by adding cup-like recesses 188 (shown with phantom lines) in the surface of the deflection shoulder 184.

The variables used to control flame timing in FIG. 10 are: cross-sectional area of gas passageway 143; shape of the bottom of volume 136; size of the gap forming volume 180, and relationship and design of the shoulder at the interior of the spark plug shell 139 at the rim of the cup 142; size of volume 182; diameter and number of flame passageways 178; and design (shape) of flame deflection shoulder 184 and recesses 188.

Figure 15A:
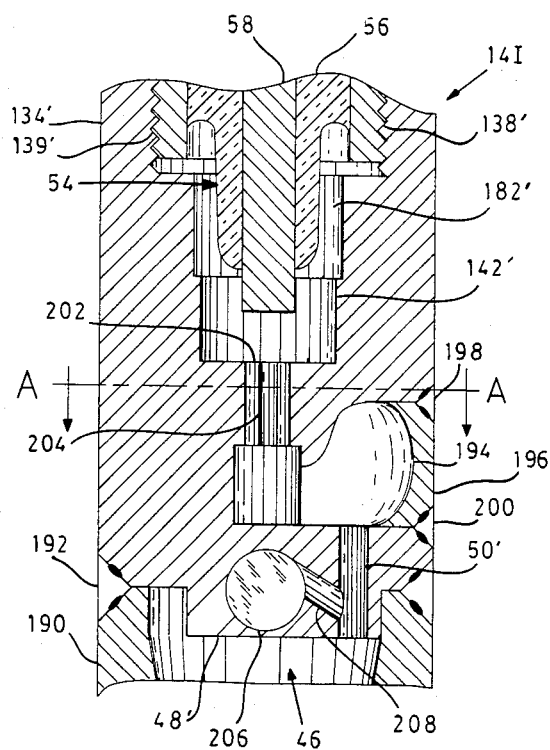
Figure 15B:
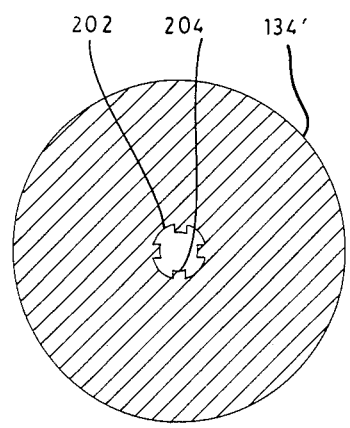

Still another embodiment of a flame ignition unit having self-regulating "spark-advance" is shown in FIG. 15. FIG. 15A is a longitudinal cross-section, and FIG. 15B is a transverse cross-section taken at A—A of FIG. 15A showing an auxiliary aperture positioned between the spark generation region and the main primary combustion chamber. In this embodiment, the flame ignition unit 14I is formed with two body portions 134', 190 joined as with a weld at 192. The upper end of body portion 134' is provided with a cup 142', the upper end of which is threaded at 138' to accept a spark plug or like device 54. This spark plug has a shortened shell 139' whereby the insulator 56 and the central electrode 58 extend into the cup 142' such that a volume 182' is produced. The inner surface of the cup 142' serves as a ground electrode in the production of a spark.

In this embodiment, a semi-isolated primary combustion chamber 194 is formed in the body portion 134' as by machining out a portion thereof, and then closing the chamber with a plate 196 welded as at 198, 200. An aperture 202 connects the volume 182' and chamber 194, with this aperture 202 being provided with charge stabilization and quenching fins 204 to control the propogation of a flame from volume 182' into the primary chamber 194.

An off-center aperture 50' connects the primary chamber 194 to a secondary chamber 46 of a type illustrated in FIG. 2 and formed within body portion 190. The barrier 48' of this embodiment is formed with a transverse cylindrical cavity 206, with a passageway 208 leading therefrom into the aperture 50'. This cavity 206 is considered to be a low density charge booster cylinder which, during lower power operation of an engine, contains a fuel mixture to ignite with or immediately following the passage of the flame front into the secondary chamber 46 to increase the velocity of a flame into an engine combustion chamber (not shown). At high power operation, the flame from chamber 194 passes passageway 208 into chamber 46 at such a high velocity that ignition of gases in cavity 206 is too late to effect the initial flame velocity. Through the choice of the various volumes and passageways a desired self regulation for spark advance or retardation can be achieved to override the control set in the computer for control of an engine of a specific design.

A rather simple flame retarding mechanism that can be incorporated in the embodiment of FIG. 9, for example, is shown in FIG. 16. For this purpose, a flame retardant cup 210 is formed to communicate with the primary chamber 44 at a position proximate the location of a spark between electrode 58 and the interior surface of the primary chamber. The orientation of this cup is such that when a flame is produced therein (upon initiation of the spark) it is initially directed away from the aperture 50. The region within the primary chamber 44 subsequently is filled with flame, and the flame exists through aperture 50 into the secondary chamber (not shown).

Having now described numerous embodiments of the present invention, the following are examples of the performance of several of these units:

EXAMPLE I

Flame ignition units similar to those shown in FIG. 2 were installed in a 1975 Chevelle, four-door, having a 350 c.i.d. engine, with a compression ratio of 8:5, automatic transmission, power brakes and power steering. The vacuum advance line to the distributor was removed, and the port plugged. The main fuel jets in the carburetor were reduced 15%. The flame ignition units had the following pertinent specifications.

| Specifications of Test 4-Cycle Flame Ignition Device | |
|---|---|
| Vol. Primary Chamber | 0.0425 c.i. |
| Vol. Secondary Chamber | 0.070 c.i. |
| Total Vol. of Chambers | 0.1125 c.i. |
| Dia. Aperture between Pri. & Sec. Chambers | 0.125 in. |
| Dia. Inlet Nozzle | 0.125 in. |
| Area Inlet Nozzle | 0.0123 sq. in. |
| Dia. Outlet Nozzle | 0.1 in. |
| Area outlet Nozzle | 0.0078 sq. in. |
| Total Area of Nozzles | 0.201 sq. in. |
| C.L. to C.L. Aperture | 5 degrees, 45 min. |
| C.L. to C.L. Inlet Port | 60 degrees |
| C.L. to C.L. Outlet Port | 30 degrees |
| C.L. Inlet Port to C.L. Outlet Port | 90 degrees |
| Ratio Vol. Chambers: Area Nozzles | 5.6 cu. in. /sq. in. |

The car was driven a total of 872 miles: 560 miles at highway speeds, and 312 miles in city driving. Fuel consumption was calculated to be 25.1 mpg on the highway, and 15.37 mpg in the city. The previous experience with this vehicle using conventional spark plugs was 16-18 mpg in highway driving, and 11-14.5 mpg in the city. The results demonstrated a 39% to 56% increase in mpg on the highway and 5.5% to 39% increase in city driving. A long-term test (about 13,500 miles) resulted in an overall 35% improvement in mpg.

Exhaust analysis equipment registered 100-150 ppm hydrocarbons and 1% CO at idle, and 20 to 60 ppm hydrocarbons and essentially zero CO at full power. (The car had no catalytic converter.)

EXAMPLE II

The same car as used for EXAMPLE I was fueled with 80% (87 octane) unleaded gas and 20% kerosene to ascertain engine knock of the engine. (This is the equivalent of about 77 octane fuel.) After the engine was thoroughly warm, the car was driven up a steep street. Essentially no knock was observed under any conditions of acceleration and little, if any, power loss was experienced.

EXAMPLE III

Flame ignition units similar to those used in EXAMPLES I AND II were installed in a 305 c.i.d Chevrolet engine on a dynamometer test stand. The only modification was the elimination of the vacuum advance on the distributor. The prior maximum output of the engine had not exceeded 200 HP units; with the flame ignition units a reading of 220 HP was recorded for an increase of at least 10%. (Power increase of about 20% was obtained in a 2300 cc 1974 Mustang II engine.)

EXAMPLE IV

Acceleration tests were performed with the automobile used in EXAMPLE I. The time required to accelerate from 0 to 60 mph was measured in two tests. With regular spark plugs and normal main fuel jets in the carburetor, each test required 12 seconds, for an average of twelve seconds. The engine was then modified by inserting flame ignition units similar to those of FIG. 2, and the main jets were reduced 15% in area. In the first test, the time was 9 seconds, and in the second test 8.8 seconds, for an average of 8.9 seconds. This is an increase of nearly 35% in power. (Similar results were obtained with a 2300 cc 1974 Mustang II.)

EXAMPLE V

Flame ignition units similar to that shown in FIG. 5 were installed in a racing boat having a 468 c.i.d. inboard engine with a 13.5:1 compression ratio. The conventional top speed of this boat is 85 mph. With the high performance flame ignition units, the boat ran well at 105 mph. This represents a power increase (ratio of speeds squared) of nearly 53%.

This bored out Chevrolet engine (originally 454 CID displacement) had a raised portion of piston face. Two high velocity nozzles were used directed against the cylinder head so as to deflect the flame behind the raised portion. This test was for data to be used in design of units for engines where power is paramount and pollution is a secondary consideration.

EXAMPLE VI

Flame ignition units similar to that shown in FIG. 11 were installed in a two-cycle 35 HP Evenrude outboard motor. This motor was mounted on a fourteen-foot Feathercraft boat. The boat was operated over a fixed course of ½ mile, with runs in both directions to minimize effects of wind and currents. With conventional spark plugs, the average elapsed time for the two runs was 55.5 seconds. The same two runs for the boat with the flame ignition units was an average of 52.8 seconds, or about a 10.5% improvement in power.

The specifications for the flame ignition units used in this test are given below.

| Specifications of Test 2-Cycle Flame Ignition Device | |
|---|---|
| Vol. Primary Chamber | 0.039 c.i. |
| Vol. Secondary Chamber | 0.041 c.i. |
| Total Vol. Chambers | 0.080 c.i. |
| Dia. Aperture Between Pri. & Sec. Chambers | 0.125 in. |
| Dia. Inlet Nozzle | 0.110 in. |
| Area Inlet Nozzle | 0.0095 sq. in. |
| Dia. Outlet Nozzle | 0.106 in. |
| Area Outlet Nozzle | 0.0088 sq. in. |
| Total Area Nozzles | 0.0183 sq. in. |
| Ratio Vol. Chambers: Area of Nozzles | 4.37 cu. in./ sq. in. |

EXAMPLE VII

Flame ignition units were installed in a 80 CID Harley Davidson motorcycle motor. The flame ignition unit used had one high velocity deflected flame nozzle and one bell-shaped nozzle as shown in FIG. 5. A noticeable improvement in power was noted without any major adjustments having been made to the engine. This was a hemispherical head engine.

As stated above, for any given engine a preferred embodiment of the present flame ignition unit is selected for optimum performance. The proper choices of the following variables optimize performance, even to reducing emissions to a level where a catalytic convertor of current design may not be required. These variables are:

location of igniting spark in relation to aperture (50)
size, location and angle of aperture (50) with respect to secondary ignition chamber (44)

volume and geometrical shape of primary ignition chamber (44)

volume above and below spark in primary ignition chamber (44)

size and orientation of any flame retarding cups (188, 210)

inside diameter of top (62) of secondary ignition chamber (46) with respect to length and inside diameter of lower portion (64)

ratio of cross sectional area of ports (nozzles) (18, 20) to total volume of chambers (44, 46) and aperture (50 location, angle and size of ports (nozzles) (18, 20)

By changing the values assigned to each of the above features, the timing duration of the flame jet from each nozzle can be varied so as to control or eliminate detonation or spark knock at heavy loads while maintaining a smooth idle with low emissions. The duration of burn can be extended so the pressure rise will allow more energy to be diverted to useful work rather than being discharged in hot exhaust gases. This same engine performed with an increase in power of 15 to 25%, even with main carburetor jets that are 15% smaller than conventional jets. With over 100,000 unit-miles on the engine, no problems have been experienced with burned valves on exhaust heat.

The leaner the fuel mixture is, the lower is the combustion temperature; thus, producing less $NO_x$ in the exhaust gases. In an effort to determine the lean barrier, i.e., the leanest mixture for good performance using these units, using low-cost unleaded regular gasoline, the cross-sectional area of carburetor main fuel jets was reduced by 24% with little or no loss in power while maintaining good engine performance. Indications are that the lean barrier will occur with a jet size reduction of about 30%, on a 17–18 to 1 air/fuel ratio on a 1975 Chevrolet 350 CID engine with a two barrel carburetor.

Although the examples given herein describe operation of the present invention in engines utilizing gasoline as fuel, other fuels are applicable. Such fuels would include all those suitable for internal combustion engines including natural gas.

As indicated above, particularly by the number of embodiments described, one of the important features of the present invention is the ease of retrofitting existing engines. The invention is not limited to a removable unit, however, and a new engine head can be manufactured to include the necessary components. Although many constructions will be apparent to one versed in the art, one construction is shown in FIG. 17 as being typical.

In this embodiment, the engine head 100' is provided with a bored passage 212 having a diameter (at appropriate positions) to form the primary and secondary chambers 44, 46, respectively. Press fit, for example, within bore 212 is an insert 214 which provides the barrier 48 having the aperture 50 therein. The upper end of bore 212 is threaded, as at 216, to accept a spark plug 54.

Formed in the top 12 of each combustion chamber is a projection 43' which corresponds to the end of the units of prior figures. This projection is provided with the inlet port 18 and exit nozzle 20 having the correct orientation for the particular engine. Alternatively, this projection can be a separate piece fitted within the lower portion of the bore 212. It will be apparent that the many other configurations shown herein can also be constructed in this manner in a new style engine. The performance of this unit is the same as that described above for the retrofit units.

From the foregoing, it will be recognized by those skilled in the art that an improved flame ignition device for internal combustion engines has been shown and fully described. Numerous embodiments of the units have been described; however, these are not provided to limit the scope of the invention but to give illustrations of the value of the present invention. Accordingly, the scope of the invention is only to be limited by the claims appended hereto and their equivalents.

I claim:

1. A flame ignitor for internal combustion engines for achieving self-regulation of ignition timing, improved fuel economy, and substantial elimination of combustion knock which comprises:

a body member extending from exterior of such engine to a combustion chamber of such engine, said body member being provided with a bore having a first end proximate an outer surface of such engine and a second end proximate an ignition portion of said combustion chamber, said first end of said bore adapted to receive a spark producing device;

a barrier wall positioned within said bore dividing said bore into a primary ignition chamber proximate said first end for surrounding said spark producing device and a secondary ignition chamber proximate said second end, said barrier wall being provided with an aperture providing communication between said primary ignition chamber and said secondary ignition chamber, said secondary chamber being provided with a portion of extended volume proximate said barrier for holding a portion of any combustable mixture entering such ignitor for regulating the velocity of a flame exiting said secondary ignition chamber as a function of pressure within said primary ignition chamber wherein ignition within such ignitor provides a flame exiting said secondary ignition chamber of sufficient velocity to substantially prevent combustion knock;

a closure for said bore at said second end, said closure being provided with a bell-shaped inlet port communicating between said combustion chamber and said secondary ignition chamber and oriented toward a region of fuel-rich mixture in said combustion chamber, and with an outlet nozzle communicating between said combustion chamber and said secondary ignition chamber and orientated to direct a flame from said secondary ignition chamber toward a region of greatest volume on an exhaust side of said combustion chamber during ignition within said combustion chamber;

wherein said bore has a central axis, said inlet port has an axis that is non-intersecting with said central axis, said outlet nozzle has an axis intersecting with said central axis, and said aperture has an axis intersecting with said central axis.

2. The flame ignition device of claim 1 further comprising a flame delay means within said primary ignition chamber to retard propogation of a flame, produced by ignition of a fuel mixture within said primary ignition chamber by a spark from said spark producing device, into and through said aperture into said secondary ignition chamber when such engine is under load.

3. The flame ignition device of claim 1 wherein the ratio of the sum of the volumes of said primary and secondary chambers, to the sum of the cross-sectional areas of said inlet port and said outlet nozzle, is greater than about 4 cubic inches/square inch.

4. The flame ignition device of claim 1 wherein said first end of said bore is threaded to accept a spark plug having a central high potential electrode to be positioned within said primary ignition chamber.

5. The flame ignition device of claim 1 wherein said body member is a head of such engine, said head being provided with at least one of said bores for each of said combustion chambers.

6. The flame ignition device of claim 1 wherein such engine includes a head provided with an opening leading to each combustion chamber of such engine, and said body member comprises a shell inserted into said openings.

7. A flame ignition unit for insertion in openings leading to each combustion chamber of an internal combustion engine for achieving self-regulation of ignition timing, improved fuel economy and substantial elimination of combustion knock, which comprises:

a body member having a first end to extend through such opening into such combustion chamber, and a second end, said body member being provided with an internal primary ignition chamber proximate said second end, and a secondary ignition chamber proximate said first end separated from said first ignition chamber by a barrier wall, said barrier wall provided with an aperture providing communication between said primary ignition chamber and said secondary ignition chamber;

said first end of said body being provided with a bell-shaped inlet port communicating with said secondary ignition chamber, said inlet port for orientation toward a region of fuel-rich mixture in such combustion chamber, and with an outlet nozzle communicating with said secondary chamber at said first end of said body member, said outlet nozzle for orientation toward a region of largest volume and highest temperature in such combustion chamber;

a spark producing means positioned within said primary ignition chamber;

mounting means for mounting said body member in such engine, said mounting means providing for sealing said body against leaks from such combustion chamber and for providing selected rotation of said body member for optimum alignment of said inlet port and said outlet nozzle with said fuel rich region and said highest temperature/largest volume region, respectively; and wherein said secondary chamber is provided with a portion of extended volume proximate said barrier for holding a portion of any combustable mixture entering such unit for regulating the velocity of a flame exiting said outlet nozzle as a function of pressure within said primary ignition chamber wherein ignition within such unit provides a flame exiting said outlet nozzle of sufficient velocity to substantially prevent combustion knock.

8. The flame ignition unit of claim 7 wherein said secondary ignition chamber is substantially cylindrical having a central axis, with said extended volume being a portion of increased diameter proximate said barrier.

9. The flame ignition unit of claim 8 wherein said inlet port has an axis that is non-intersecting with said axis of said secondary ignition chamber whereby said fuel-rich mixture entering said inlet port is caused to swirl about the interior of said secondary ignition chamber, and said outlet nozzle has an axis that intersects said axis of said secondary ignition chamber whereby a flame progressing through said secondary ignition chamber is not substantially delayed in passage through said outlet nozzle.

10. The flame ignition unit of claim 9 wherein said aperture has an axis substantially directed toward said outlet nozzle.

11. The flame ignition unit of claim 7 further comprising at least one additional bell-shaped inlet port and at least one additional outlet nozzle communicating between said secondary ignition chamber and such combustion chamber at said first end of said body member.

12. The flame ignition unit of claim 7 wherein the ratio of the sum of the volumes of the primary and secondary chambers to the sum of the cross-sectional areas of said inlet port and outlet nozzle is greater than about 4 cubic inches per square inch.

13. The flame ignition unit of claim 7 wherein such opening is threaded throughout its length and is provided with an annular shoulder on the exterior of such engine, and said mounting means comprises:

threads provided on a portion of the exterior of said body member toward said first end for threadable engagement with threads of such opening; and a seal ring surrounding said body member external to such engine, such seal ring forming an interference fit with an unthreaded portion of the exterior of said body and a seal against said annular shoulder when such unit is installed in such engine, such interference fit providing for rotation of said body member for said optimum alignment of said inlet port and said outlet nozzle within such combustion chamber.

14. The flame ignition unit of claim 7 wherein such opening is threaded throughout its length and is provided with an annular shoulder on the exterior of such engine, said body member is cylindrical, and said mounting means comprises:

a sleeve member having external threads for threadable engagement with threads of such opening, said sleeve member being provided with a central bore extending from exterior such engine to such combustion chamber for closely receiving said body member and providing for rotation of said body member for said optimum alignment of said inlet port and said outlet nozzle within such combustion chamber;

clamping means carried on an exterior surface of said sleeve exterior to such engine; and a gasket member sealing said sleeve member against said annular shoulder.

15. The flame ignition unit of claim 13 wherein said annular shoulder of such opening is tapered, and said seal ring is provided with a tapered surface to seal against said tapered annular shoulder.

16. The flame ignition unit of claim 7 wherein said body member has a first portion containing said primary ignition chamber, said barrier and said aperture juxtaposed to a second portion containing said secondary chamber, said inlet port and said outlet nozzle, and further comprises a seal member between said first portion and said second portion.

17. The flame ignition unit of claim 16 wherein said seal member comprises:

an upstanding sleeve on said second portion of said body member having an internal bore to slidably receive said first portion of said body member, said upstanding sleeve having external threads;

an internally threaded collar for threadable engagement with said threads on said sleeve; and an annular gasket interposed between said first and second portions of said body member.

18. The flame ignition unit of claim 17 wherein secondary ignition chamber has an axis and wherein said upstanding sleeve has an axis oriented at an angle to said axis of said secondary ignition chamber.

19. The flame ignition unit of claim 7 wherein said spark producing means comprises a high tension electrode, an insulator substantially surrounding said high tension electrode, and a ground electrode.

20. The flame ignition unit of claim 19 wherein said ground electrode comprises the surface of said primary ignition chamber.

21. The flame ignition unit of claim 7 wherein said primary ignition chamber comprises a plurality of interconnected volumes between said spark producing means and said aperture for retarding flame propogation at relatively high pressures within said primary ignition chamber, said high pressures associated with high power operation of such engine, without significantly retarding said flame propogation at relatively lower pressure within said primary ignition chamber, said lower pressure associated with idle operation of such engine.

22. The flame ignition unit of claim 21 wherein said plurality of interconnecting volumes comprises an insert positioned within said primary ignition chamber forming a first chamber portion proximate said spark producing means and a second chamber portion proximate said aperture, said insert provided with a cup recess substantially surrounding said spark producing means and with a plurality of passageways which communicate between said first and second chamber portions of said primary ignition chamber.

23. The flame ignition unit of claim 7 wherein said secondary ignition chamber is substantially cylindrical having a central axis and said extended volume is a first region of increased diameter and a second region of further increased diameter proximate said barrier.

24. A flame ignition unit for insertion in threaded openings leading to each combustion chamber of an internal combustion engine such opening having a radial shoulder, for achieving self-regulation of ignition timing over a wide range of engine load conditions from idle to full power, such flame ignition unit substantially eliminating combustion knock while achieving improved fuel economy and reduced emissions, which comprises:

a substantially cylindrical body member having a first end portion to extend through such opening into such combustion chamber, a second end portion and an intermediate portion, said body member being provided with an internal substantially cup-shaped primary ignition chamber within said second end portion, and with a substantially cylindrical secondary ignition chamber having an axis within said first end of said body member separated from said primary ignition chamber ignition chamber by a barrier wall, said barrier wall provided with an aperture providing communication between said primary ignition chamber and said secondary ignition chamber, said secondary ignition chamber being provided with a portion of enlarged diameter proximate said barrier wall for holding a portion of any combustable mixture entering such unit for regulating the velocity of a flame exiting said secondary ignition chamber as a function of pressure within said primary ignition chamber wherein ignition within such unit provides a flame exiting said secondary ignition chamber of sufficient velocity to substantially prevent combustion knock;

said first end of said body member being provided with a bell-shaped inlet port, having an axis, communicating with said secondary ignition chamber, said inlet port for orientation toward a region of fuel-rich mixture in such combustion engine with said axis of said inlet port not intersecting said axis of said secondary chamber, but being at first selected angle to said axis of said secondary ignition chamber, whereby said fuel-rich mixture entering through said inlet port is caused to swirl about the interior of said secondary ignition chamber;

said first end of said body member being further provided with an outlet nozzle, having an axis, communicating with said second ignition chamber, said outlet nozzle for orientation to direct a flame from such unit toward a region of largest volume and highest temperature in such combustion chamber said axis of said outlet nozzle intersecting, and being at a second selected angle to, said axis of said secondary ignition chamber;

a spark producing means positioned within said primary ignition chamber, said spark producing means comprising a central high tension electrode, an insulator surrounding said high tension electrode and a ground electrode whereby a spark can be produced between said high tension electrode and said ground electrode; and mounting means for sealingly positioning said body member in such opening and selectively orienting said inlet port and said outlet nozzle toward said fuel-rich region and highest temperature region, respectively, said mounting means comprising threads on the external surface of said first end of said body member for threadable engagement with such threads of such opening, and a seal ring surrounding said body member, said seal ring having a side surface for sealing against such annular shoulder and an inner edge surface for an interference fit with said intermediate portion of said body member whereby said body member can be rotated after contact of said side surface of said seal ring with said annular shoulder for selective alignment of said inlet port and said outlet nozzle within such combustion chamber.

25. The flame ignition unit of claim 24 wherein said first selected angle is about sixty (60) degrees, said second selected angle is about thirty (30) degrees, and where said axis of said inlet port is oriented at about ninety (90) degrees from said axis of said outlet nozzle.

* * * * *